US006711587B1

(12) United States Patent
Dufaux

(10) Patent No.: US 6,711,587 B1
(45) Date of Patent: Mar. 23, 2004

(54) KEYFRAME SELECTION TO REPRESENT A VIDEO

(75) Inventor: Frederic Dufaux, Chestnut Hill, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 09/654,302

(22) Filed: Sep. 5, 2000

(51) Int. Cl.$^7$ ............................................... G06F 17/30
(52) U.S. Cl. ...................................... 707/104.1; 707/6
(58) Field of Search .......................... 707/6, 10, 104.1; 382/103, 118

(56) References Cited

U.S. PATENT DOCUMENTS

| | | | |
|---|---|---|---|
| 5,485,611 | A | 1/1996 | Astle |
| 5,600,775 | A | 2/1997 | King et al. |
| 5,635,982 | A | 6/1997 | Zhang et al. |
| 5,821,945 | A | 10/1998 | Yeo et al. |
| 5,956,026 | A | 9/1999 | Ratakonda |
| 5,995,095 | A | 11/1999 | Ratakonda |
| 6,014,183 | A | 1/2000 | Hoang |
| 6,173,069 | B1 * | 1/2001 | Daly et al. ................... 382/118 |
| 6,195,458 | B1 | 2/2001 | Warnick et al. |
| 6,263,088 | B1 | 7/2001 | Crabtree et al. |
| 6,278,446 | B1 | 8/2001 | Liou et al. |
| 6,298,145 | B1 * | 10/2001 | Zhang et al. ............... 382/103 |
| 6,331,859 | B1 | 12/2001 | Crinon |
| 6,363,380 | B1 * | 3/2002 | Dimitrova ...................... 707/6 |
| 6,366,296 | B1 | 4/2002 | Boreczky et al. |
| 6,389,168 | B2 | 5/2002 | Altunbasak et al. |
| 2002/0054083 | A1 | 5/2002 | Boreczky et al. |

OTHER PUBLICATIONS

Frankel, C., et al., "WebSeer: An Image Search Engine for the World Wide Web," (Report No. 96–14). Chicago, IL: University of Chicago Computer Science Department. (Aug. 1, 1996).

Smith, J.R., and Chang, S., "Searching for Images and Videos on the World–Wide Web," (Report No. 459–96–25). New York, NY: Columbia University Dept. of Electrical Engineering and Center for Image Technology for New Media. (Aug. 19, 1996).

Yeo, B., and Liu, B., "Rapid Scene Analysis on Compressed Video," *IEEE Transactions on Circuits and Systems for Video Technology*, 5(6) :533–544 (Dec. 1995).

Naphade, M.R., et al., "A High–Performance Shot Boundary Detection Algorithm Using Multiple Cues," *IEEE*, 4 pages. (1998).

Zhuang, Y., "Adaptive Key Frame Extraction Using Unsupervised Clustering," *IEEE*, 5 pages. (1998).

"Scour.Net Web Site Offers First Multimedia Search Engine and Guide," Los Angeles, CA: Scour, Inc. company press release, (Aug. 18, 1998).

Zhang, H.Z. et al., "A Video Database System for Digital Libraries," in *Advance in Digital Libraries*, Lecture Notes in Computer Science, Chapter 15, p. 321, Springer Verlag, 1995.

Zhang, H.Z. et al., "Automatic Partitioning of Full–motion Video," Multimedia Systems, vol. 1, pp. 10–28, Jul. 1993.

Jones, M.J. and Rehg, J.M., "Statistical Color Models with Applications to Skin Detection," TR 98–11, CRL, Compaq Computer Corp., Dec. 1998.

Rowley, H.A., et al., "Neural Network–Based Face Detection," IEEE Trans. on PAMI, 20(1);23–38, 1998.

* cited by examiner

*Primary Examiner*—Diane D. Mirzahi
*Assistant Examiner*—Apu Mofiz

(57) ABSTRACT

A key frame representative of a sequence of frames in a video file is selected by applying face detection to a video to select a key frame which may include people and has particular application to indexing video files located by a search engine web crawler. A key frame, one frame representative of a video file, is extracted from the sequence of frames. The sequence of frames may include multiple scenes or shots, for example, continuous motions relative to a camera separated by transitions, cuts, fades and dissolves. To extract a key frame face detection is performed in each frame and a key frame is selected from the sequence of frames based on a sum of detected faces in the frame.

29 Claims, 15 Drawing Sheets

KEYFRAME SELECTION TO REPRESENT A VIDEO

BACKGROUND OF THE INVENTION

The World Wide Web ("WWW") is comprised of millions of documents (web pages) formatted in Hypertext Markup Language ("HTML"), which can be accessed from thousands of users through the Internet. To access a web page, its Uniform Resource Locator ("URL") must be known. Search engines index web pages and make those URLs available to users of the WWW. To generate an index, a search engine may search the WWW for new web pages using a web crawler. The search engine selects relevant information from a web page after analyzing the content of the web page and saves the relevant information and the web page's URL in the index.

Web pages also contain links to other documents on the WWW, for example, text documents and image files. By searching web pages for links to image files, a search engine connected to the WWW provides an index of image files located on the WWW. The index contains a URL and a representative image from the image file.

Web pages also contain links to multimedia files, such as video and audio files. By searching web pages for links to multimedia files, a multimedia search engine connected to the WWW, such as Scour Inc.'s SCOUR.NET, provides an index of multimedia files located on the WWW. SCOUR.NET's index for video files provides text describing the contents of the video file and the URL for the multimedia file. Another multimedia search engine, WebSEEK, summarizes a video file by generating a highly compressed version of the video file. The video file is summarized by selecting a series of frames from shots or scenes, in the video file and repackaging the frames as an animated GIF file. WebSEEK also generates a color histogram from each shot in the video to automatically classify the video file and allow content-based visual queries. It is described in John R. Smith et al. "An Image and Video Search Engine for the World-Wide Web", Symposium on Electronic Imaging: Science and Technology—Storage and Retrieval for Image and Video Databases V, San Jose, Calif., Febuary 1997, IS&T/SPIE.

Finding a representative image of a video to display is very subjective. Also, analyzing the contents of digital video files linked to web pages is difficult because of the low quality and low resolution of the highly compressed digital video files.

SUMMARY OF THE INVENTION

One technique for finding a representative image of a video to display is to find a frame which is likely to include people. This technique is described in co-pending U.S. patent application Ser. No. 09/248,545 entitled "System for Selecting a Keyframe to Represent a Video" by Frederic Defaux et al. The likelihood of people in a frame is determined by measuring the percentage of skin-color in the frame. Skin-color detection is a learning-based system trained on large amounts of labeled data sampled from the WWW. Skin color detection returns, for each frame in the shot, the percentage of pixels classified as skin.

The present invention provides a mechanism for selecting a representative image from a video file by providing a technique for applying face detection to a video to select a key frame which may include people and has particular application to indexing video files located by a search engine web crawler. A key frame, one frame representative of a video file, is extracted from the sequence of frames. The sequence of frames may include multiple scenes or shots, for example, continuous motions relative to a camera separated by transitions, cuts, fades and dissolves. To extract a key frame face detection is performed in each frame and a key frame is selected from the sequence of frames based on a sum of detected faces in the frame.

Face detection in a frame may be performed by creating a set of images for the frame. Each image in the set of images is smaller than the previous image. Each image is smaller than the previous image by the same scale factor. Selected ones of the set of images are searched for faces. The selected ones are dependent on the minimum size face to detect. The validity of a detected face is ensured by tracking overlap of a detected face in consecutive frames.

Shot boundaries may be detected in the sequence of frames. A key shot is selected from shots within the detected shot boundaries based on the number of detected faces in the shot. A shot score may be provided for each detected shot. The shot score is based on a set of measures. The measures may be selected from the group consisting of motion between frames, spatial activity between frames, skin pixels, shot length and detected faces. Each measure includes a respective weighting factor. The weighting factor is dependent on the level of confidence of the measure.

Face detection may process different size frames by modifying the size of the frame before performing the face detection.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
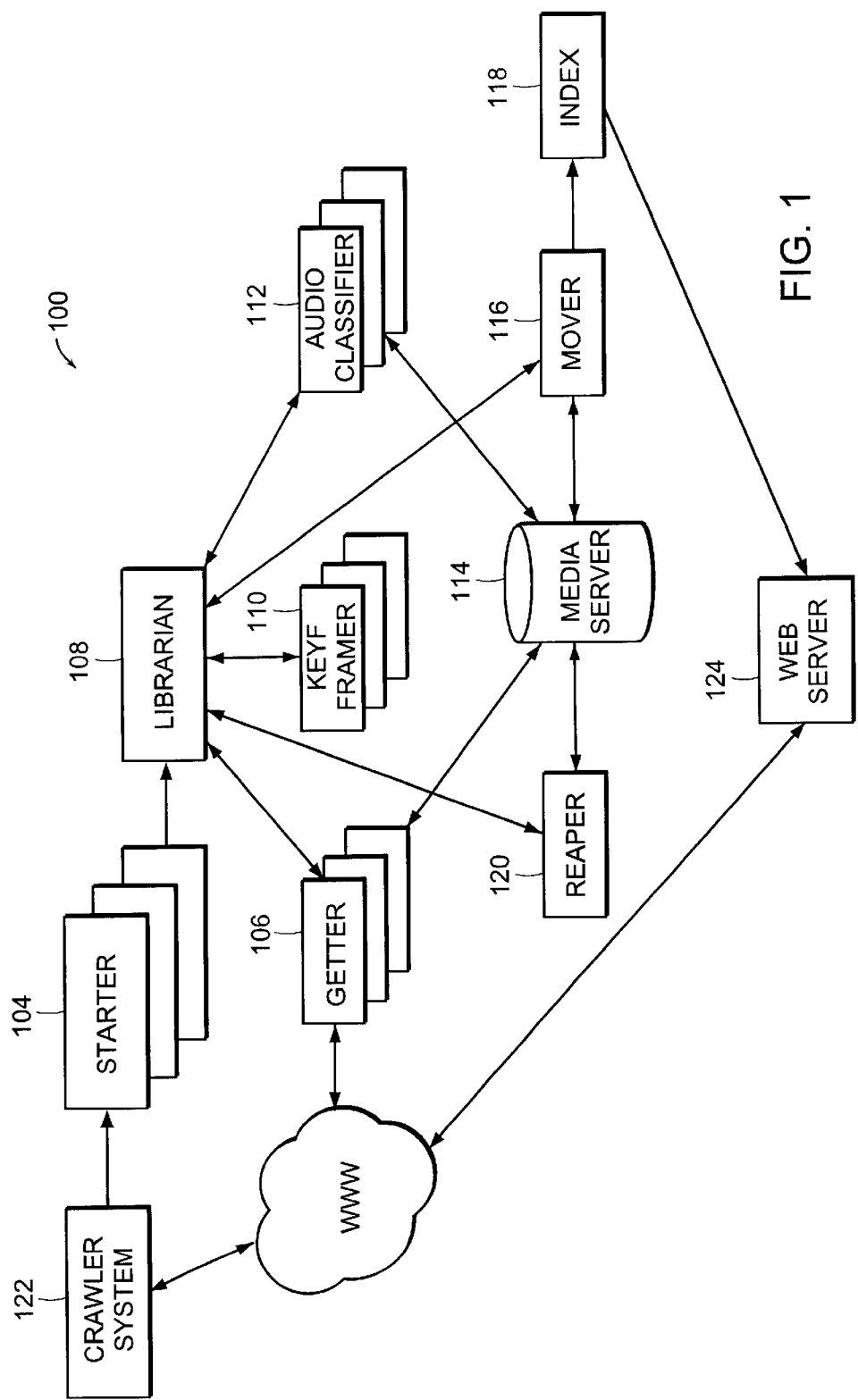
FIG. 1 illustrates components of a multimedia search engine connected to the World Wide Web for generating an index of multimedia files including an extracted key frame for a video file.

FIG. 1 illustrates a WWW-connected search engine including a webcrawler 122, a web server 124 for allowing web users to access an index 118, and a multimedia index system 100 for creating the index 118 of multimedia files. The crawler system 122, separate from the multimedia index system 100, is connected to the WWW and crawls the WWW searching for web pages containing URLs to multimedia files. The crawler system extracts key text, determined to be relevant, from the web page and stores the text, the web page's URL, and the URLs of any multimedia files found on the web page. The components of the multimedia index system 100 for extracting representations of the multimedia files and classifying files include a librarian 108 for keeping track of data and controlling workflow in the system, daemons 104, 106, 110, 112, 116, and 120 for performing work in the system and a media server 114.

The librarian 108 is a relational database. The daemons query the librarian 108 for work to perform and add to the librarian 108 work for other daemons to perform. The system daemons include a starter daemon 104, a getter daemon 106, a keyframer daemon 110, an audio classifier daemon 112, a reaper daemon 120 and a mover daemon 116. There may be multiple copies of each type of daemon, allowing the system to scale to index a large number of multimedia files. The operation of the components of the multimedia index system 100 is described later in conjunction with FIG. 2.

Figure 2:
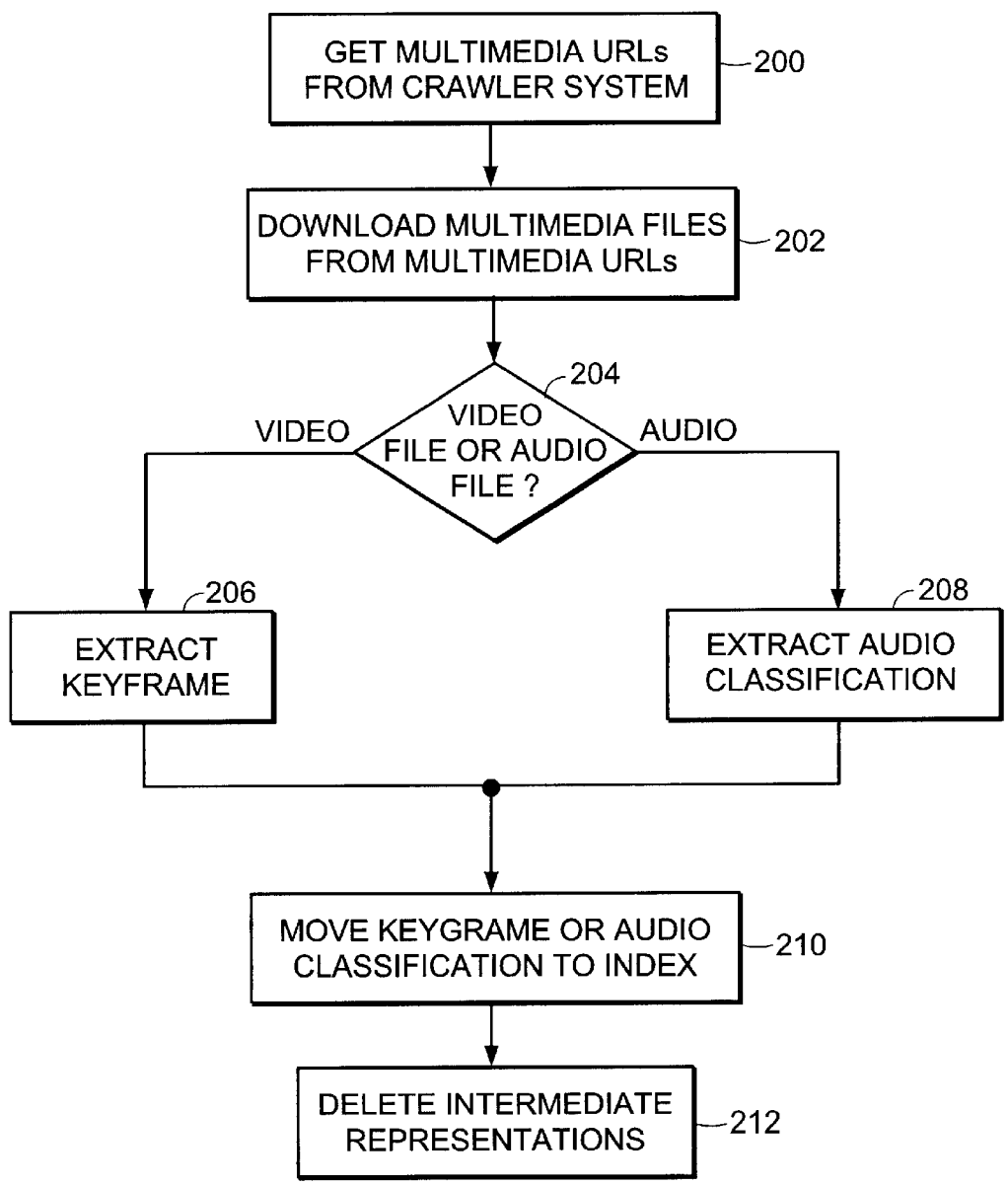
FIG. 2 is a flowchart showing the steps for creating an index of multimedia files including the file's URL and a key frame.

At step 200 in FIG. 2, a starter daemon 104 in the multimedia index system 100 periodically checks to see if the crawler system has identified multimedia URLs to be downloaded. If there are multimedia URLs to be downloaded, the starter daemon 104 downloads the multimedia URLs and relevant text from the crawler system, and puts them into the librarian 108. The addition of multimedia URLs to the librarian 108 by the starter daemon 104 creates work for a getter daemon 106.

At step 202, a getter daemon 106 periodically checks with the librarian 108 to determine if there are multimedia URLS to be processed. The getter daemon 106, using the multimedia URLs downloaded by the starter daemon 104, downloads the multimedia files. Step 202 is described in greater detail later in conjunction with FIG. 3.

At step 204, if the multimedia file is a video file, the getter daemon 106 adds work to the librarian 108 for the keyframer daemon 110. If the multimedia file is an audio file the getter daemon 106 adds work to the librarian 108 for the audio classification daemon.

At step 208, the audio classification daemon periodically polls the librarian 108 to determine if there are requests for classification of an audio file. The audio classification daemon analyzes the audio file, and classifies the audio file as either music or speech, and stores the classification with the audio file and the audio file's URL in the media server 114.

At step 206, the keyframer daemon 110 periodically polls the librarian 108 to determine if there are requests for generating a representation for a video file. The keyframer daemon analyzes the video file and extracts a representation from the video file. The representation extracted is a key frame. After the key frame is extracted, the keyframer daemon 110 adds work to the librarian 108 for the mover daemon 116 and the reaper daemon 120.

At step 210, the mover daemon 116 periodically polls the librarian 108 for work. Finding work created by the audio classification daemon 112 or the keyframer daemon 110, the mover daemon 116 moves the audio classification produced by the audio classification daemon or the keyframe produced by the keyframer daemon 110 to the index of multimedia files 118 which is available to the web server 124.

At step 212, the reaper daemon 120 periodically polls the librarian 108 for work. Finding work created by the keyframer daemon 110, the reaper daemon 120 deletes the video file representative text and URL downloaded by the starter daemon 104 and the video file downloaded by the getter daemon 106. These files and representations are no longer required by the multimedia system because all work depending on them has been completed.

Figure 3:
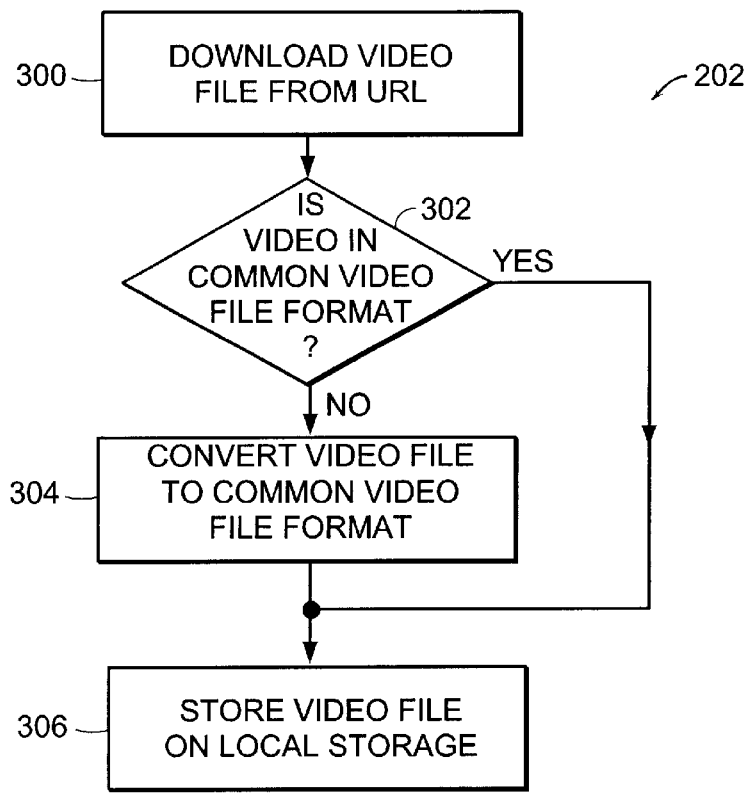
FIG. 3 is a flowchart showing the steps for the step of downloading multimedia files shown in FIG. 2.

At step 300, in FIG. 3 the getter daemon 106 downloads a multimedia file from the multimedia URL as discussed later in conjunction with FIG. 2.

At step 302, after the multimedia file has been downloaded, the getter daemon 106 determines the format of the multimedia file. Digital video files linked to web pages may be in many different formats, including Audio Video Interleave ("AVI"), Advanced Streaming Format ("ASF"), RealAudio, MPEG and Quicktime. The getter daemon 106 transcodes the digital video files to a common digital video format, for example, AVI format. After the transcoding, the getter daemon 106 stores the common format digital video file and a meta-data file for the digital video file. The meta-data file includes information on the digital video file, such as the title, author, copyright and video frame rate.

At step 306 the meta-data file and the common video format file are stored on local storage.

Figure 4:
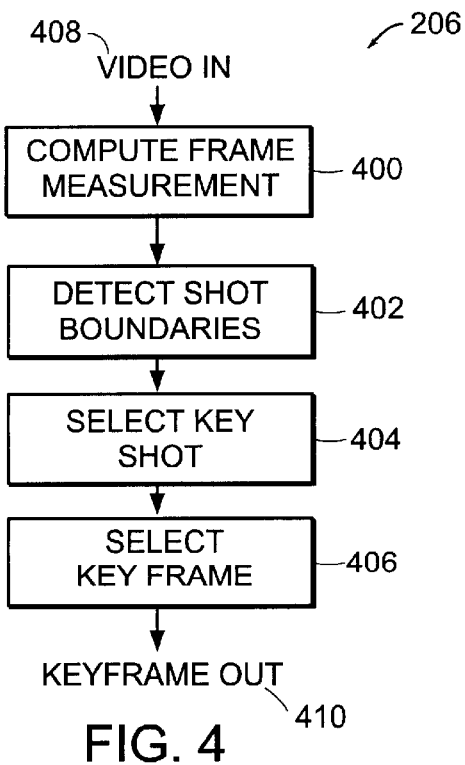
FIG. 4 is a flowchart showing the steps for the step of extracting a key frame shown in FIG. 2.

Step 206 in FIG. 2 is described in greater detail later in conjunction with FIG. 4. FIG. 4 illustrates a high level flowchart showing the steps the keyframer daemon 110 performs to select a key frame for the video sequence in common video format.

At step 400 a number of measures are computed and stored for every frame in the video sequence. The measures include motion, spatial activity(entropy), skin color and face detection. The sequence of frames may be grouped into a sequence of shots. A shot is a sequence of frames resulting from a continuous operation of the camera in which there is no significant change between pairs of successive frames.

At step 402, shot boundaries are detected in the video sequence. A shot boundary is detected by detecting a significant change between successive frames. The shot boundaries are detected dependent on the measures computed at step 400. After the shot boundaries have been detected, a most interesting shot is selected from the video sequence at step 404 dependent on measures including motion activity, entropy, face detection, skin color and length of the shot. After the shot has been selected, a key frame is selected from within the selected shot at step 406 dependent on measures including motion activity, skin pixels, face detection and entropy.

Figure 5:
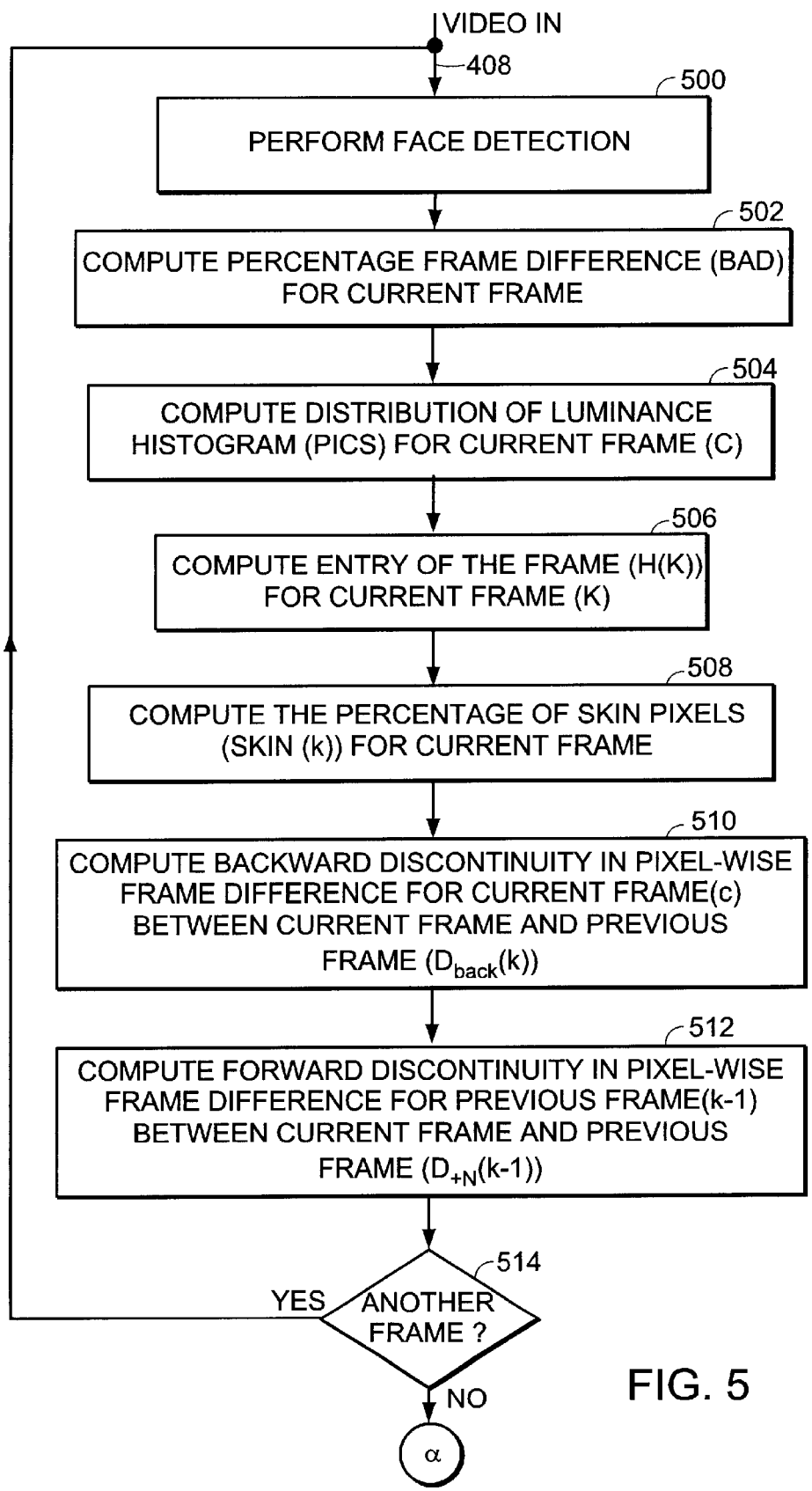
FIG. 5 is a flowchart showing the steps for the step of computing frame measurements shown in FIG. 4.

Step 400 in FIG. 4 is described in greater detail later in conjunction with FIG. 5. FIG. 5 illustrates the measures that are computed for each frame in order to select a key frame from a digital video file. Successive frames in the same shot in a digital video file have the same or continuously varying camera viewpoint with the only difference between the frames being due to object motion or camera action. An object motion may, for example, be a person walking and a camera action may be a pan or a zoom results in changes in successive frames.

At step 500, face detection is performed for each frame in the video sequence. Face detection is described in conjunction with FIG. 6. The presence of people in static photographs has been detected through the use of face detection.

A method for performing neural network face detection in a photograph is described in "Neural Network-Based Face Detection", by H. A. Rowley et al. in IEEE Trans. on PAMI, 20 (1):23–38, 1998 which is incorporated herein by reference in its entirety. The method described by H. A. Rowley et al. is an upright face detection system. A retinally connected neural network examines small fixed size windows of an image and determines whether each window contains a face. The system arbitrates between multiple networks to improve performance over a single network. To detect faces larger than the window size in the static image, a set of reduced size images based on the static image is generated. The set of reduced size images is created by repeatedly reducing the size of the previous image in the set of reduced size images. An image is reduced in size by subsampling the previous image. Face detection is applied to each image in the set of images by applying a neural network-based algorithm on a fixed size window which is moved across the image one pixel at a time. The window must be a fixed size because the algorithm is trained to recognize faces located within the window.

The window of the image is pre-processed by equalizing the intensity values across the window in order to compensate for lighting conditions. Then, histogram equalization is performed to compensate for differences in camera input gains and to improve contrast. The pre-processed window is passed through a neural network. The neural network has multiple types of hidden units. The hidden units include units which look at 10×10 pixel subregions, 5×5 pixel subregions and overlapping 20×5 pixel horizontal stripes of pixels. Each hidden unit detects features that may be important for face detection, for example, mouths, pairs of eyes, individual eyes, the nose and corners of the mouth. The neural network has a single, real-valued output which indicates whether or not the window contains a face.

All images in the set of images are searched for frontal faces. This is a very time consuming process in which it can take up to four minutes to process a 320×240 pixel image. A video includes a sequence of images to search for faces which are likely not to be frontal faces because people in a video do not tend to look directly at the camera. Also, searching the contents of digital video files linked to web pages for faces is difficult because of the low quality and low resolution of the highly compressed digital video files.

Figure 6:
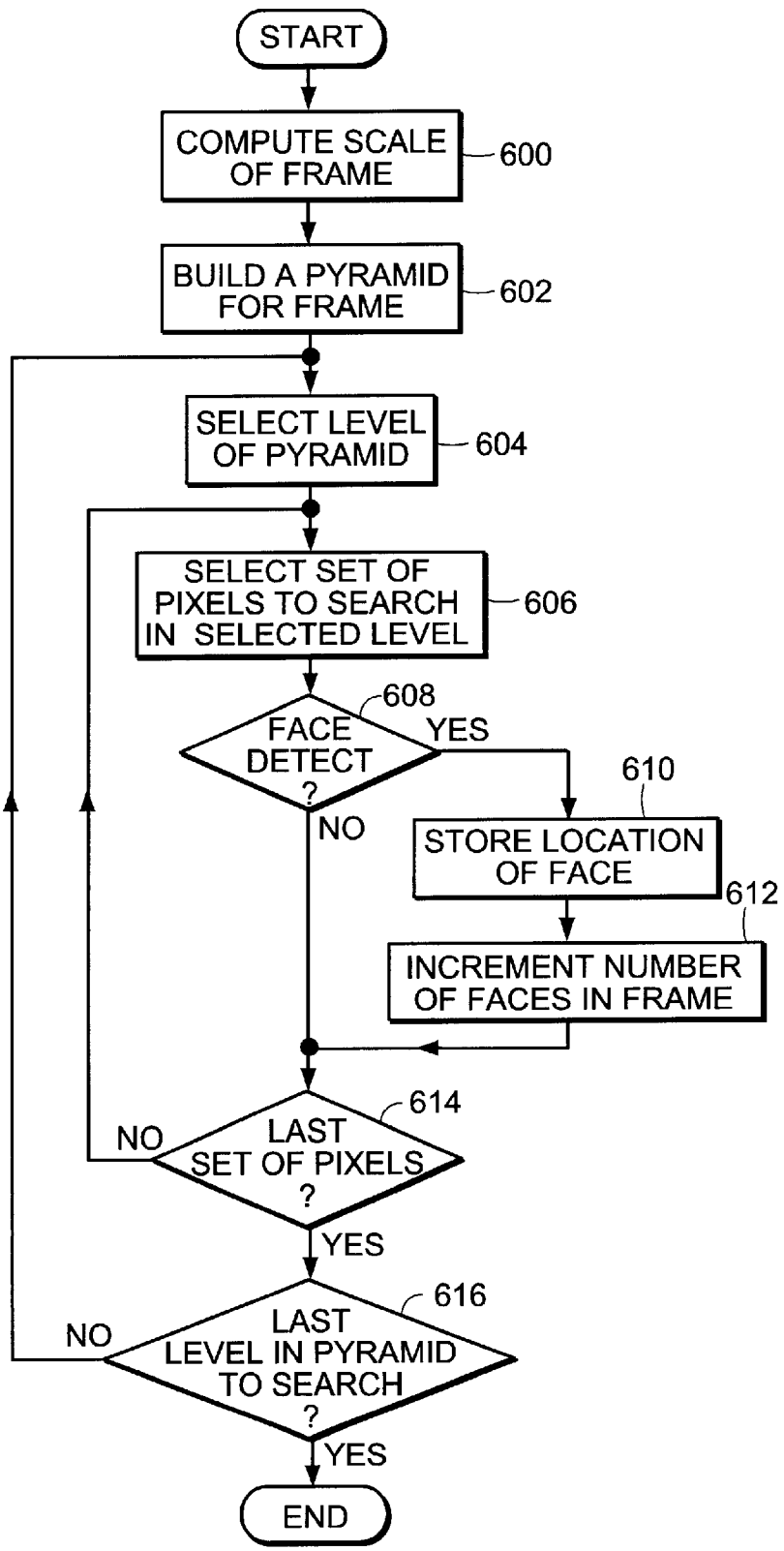
FIG. 6 is a flowchart illustrating a method for detecting one or more faces in a frame of a video according to the principles of the present invention.

FIG. 6 is a flowchart illustrating a method for detecting one or more faces in a frame of a video according to the principles of the present invention.

At step 600, the face detector computes a scale factor dependent on the size of the frame size of the input image. The frame size for videos stored on the Internet are not a fixed size thus, face detection can be applied to videos with any size frame by computing the scale factor dependent on the frame size for the original image. Processing continues with step 602.

At step 602, in order to detect different size faces in the input image, a low-pass pyramid is built from the input image. A low pass pyramid is a set of reduced size images created from the input image. The input image is at the top of the pyramid. The set of images is created from the input image by decreasing the size of the input image by a scaling factor. Each image in the set of images is created by decreasing the size of the previous image by the same scaling factor. For example, each image in the set of images can be 90% of the size of the previous image. The pyramid scaling factor is determined using the following equation:

$$Scale\ Factor = \left(\frac{400}{(area\_min.H.W)}\right)^{\frac{1}{(2.scale\_start)}}$$

where: scale_start is the level of the pyramid in which to start searching.

area_min is set to 0.12 in order to look for a face in an area which is 12% of the image.

H is the height of the input image.

W is the width of the input image.

Scale Factor is typically between 0.8 and 0.9.

Figure 7:
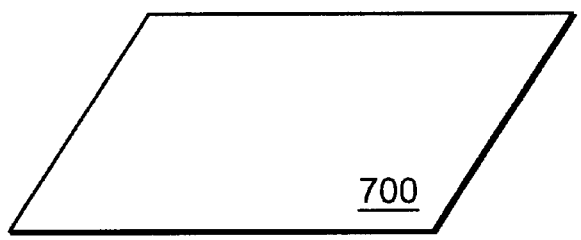
FIG. 7 illustrates the pyramid or set of images created from the input image 700.
Figure 7:
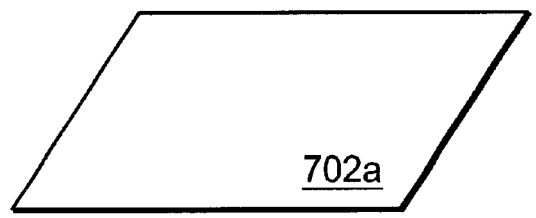
Figure 7:
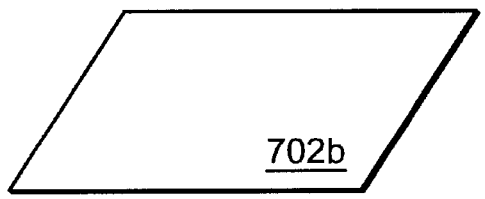
Figure 7:
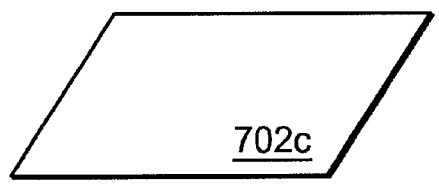
Figure 7:
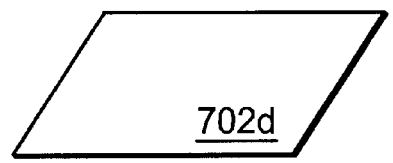
Figure 7:
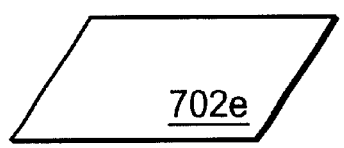

FIG. 7 illustrates the pyramid or set of images created from the input image 700. The input image 700 is the top of the pyramid. Image 702a is created from the input image 700 by reducing the size of input image 700 by a scaling factor. Image 702b is created by reducing the size of image 702a by the same scaling factor, image 702c is created by reducing the size of image 702b by the same scaling factor, image 702d is created by reducing the size of image 702c by the same scaling factor and image 702e is created by reducing the size of image 702d by the same scaling factor. The size of the previous image is reduced using sampling techniques well-known in the art. The Scale Factor is dependent on the size of the original image. The pyramid allows faces of different sizes to be found. Returning to FIG. 6, processing continues with step 604.

At step 604, one of the images 700, 702a–d in the pyramid is selected as the first image in which to search for a face. In order to determine if the frame includes people, it is not necessary to detect all faces in the frame. Also, frames including small faces are not likely to be representative of the video. Thus, face detection is only performed in a portion of the set of images created for the input image. The reduced image in the pyramid in which to start face detection is dependent on the minimum size face to find. For example, faces greater than 12% of the total original frame may only be interesting and thus the starting image is selected to find faces which are 12% of the total input image. Thus, the search can be limited to a number of levels in order to look for larger faces in only smaller images. However, all levels are computed even though they are not searched because it is relatively inexpensive to compute each level. In an alternative embodiment, only the levels to be searched may be computed. The number of levels of the pyramid to search are dependent on a scale_end parameter and a scale_interval parameter. Scale_end is the level of the pyramid in which to end searching and scale interval is the number of levels to go down after each search. Providing the ability to select a portion of the levels of the pyramid reduces the processing time because face detection is more time consuming at higher levels. In an embodiment for detecting faces greater than 12% of the image, if the scaling factor is selected to be 90%, face detection is performed in levels 4–6 of the pyramid by setting scale_start to level 4 and scale_end to level 6. Processing continues with step 606.

At step 606, a neural network based algorithm to detect faces is applied to the frame. The neural network based algorithm is applied on a block of 20×20 pixels; that is, a fixed size window in the selected image in the pyramid. A method for performing neural network-based face detection in a static photograph is described in "Neural Network-Based Face Detection", by H. A. Rowley et al. in IEEE Trans. on PAMI, 20 (1):23–38, 1998 which is incorporated herein by reference in its entirety. The fixed size window is moved across the entire image one pixel at a time in order to search for a face in the image contained within the fixed size window.

Figure 8:
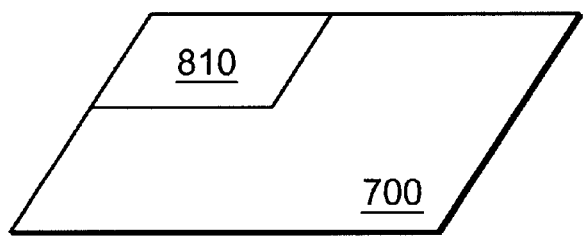
FIG. 8 illustrates the different face sizes detected in each of the images 700, 702a–e, in the pyramid shown in FIG. 7.
Figure 8:
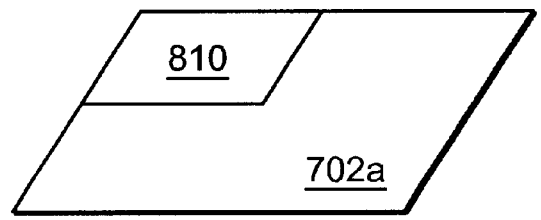
Figure 8:
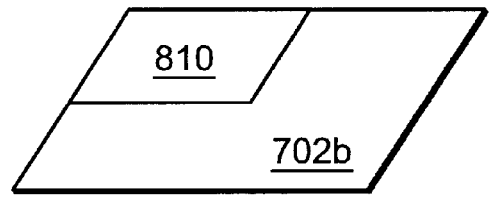
Figure 8:
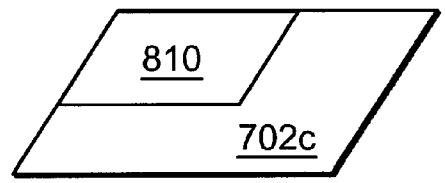
Figure 8:
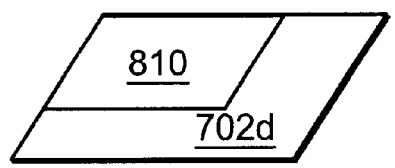
Figure 8:
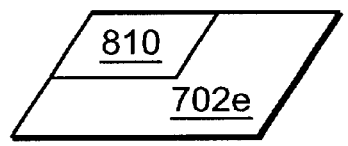

FIG. 8 illustrates the different face sizes detected in each of the images 700, 702*a–e*, in the pyramid shown in FIG. 7. The smallest face is detected by searching for a face in the fixed size window 810 in the input image 700 and the largest face is detected by searching for a face in the fixed size window 810 in the smallest image 702*e*. Other size faces are detected by searching in the fixed size window in the other images 700*a–c*. The fixed size window 810 is passed over the image 700, 702*a–e* one pixel at a time. Returning to FIG. 6, processing continues with step 608.

At step 608, if a face is detected within the fixed size window 810 in an image 700, 702*a–d* in the pyramid, processing continues with step 610. If not, processing continues with step 614.

At step 610, the location of the detected face in the selected image 700*a–d* with respect to the input image 700 is stored. Processing continues with step 612.

At step 612, the number of detected faces in the input image 700 is incremented. Processing continues with step 614.

At step 614, if the last set of pixels in the frame has not been searched, processing continues with step 606 to check the next set of pixels in the frame. If so, processing continues with step 616 to continue scanning the next level in the pyramid.

At step 616, if the last frame in the set of reduced scale frames has been checked, processing is complete. If not, processing continues with step 604 to select the next reduced scale frame.

The face detector is prone to false negatives and false positives. False-negatives are mainly due to rotated, occluded or small faces such frames are more likely not interesting and thus not likely to be a representative frame, therefore, false-negatives are not detrimental to the key frame extraction process, unlike false-positives. Thus, a tracking system is used to track faces in successive frames in order to reduce the number of false-positives.

Figure 9A:
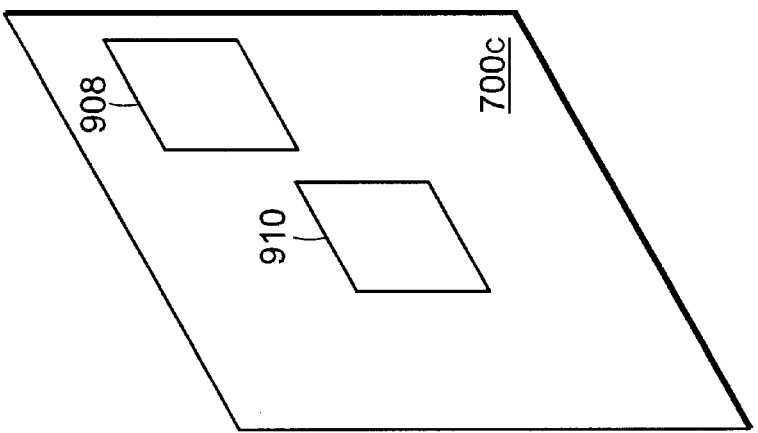
FIG. 9A illustrates a method for reducing false positives by tracking a detected face across several consecutive frames.
Figure 9A:
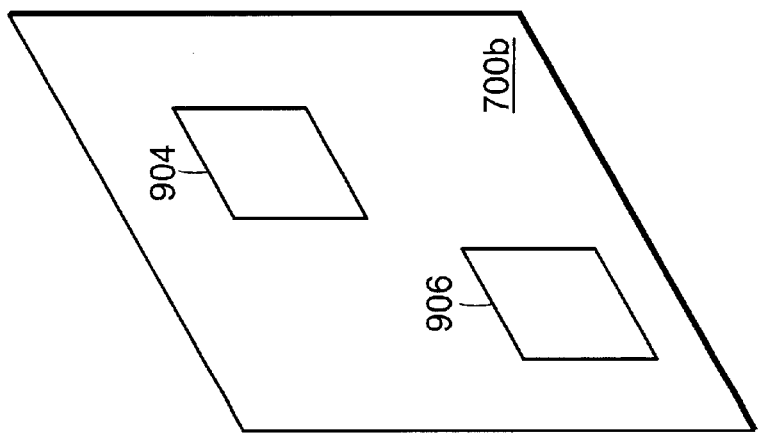
Figure 9A:
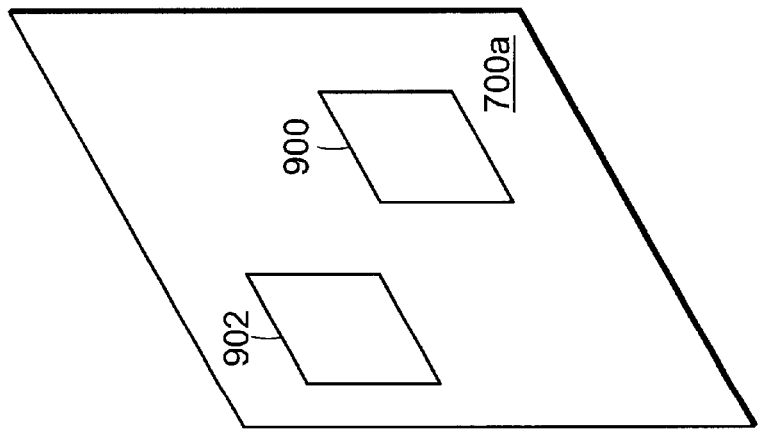

FIG. 9A illustrates a method for reducing false positives by tracking a detected face across several consecutive frames. Three consecutive frames 700*a–c* are tracked. Face 900 and face 902 were detected in frame 700*a*, face 904 and face 906 were detected in frame 700*b*, face 908 and face 910 were detected in frame 700*c*. It is assumed that a true face will be detected in the same region of the image in successive frames, so those which are not can be discarded as false positives. Detected faces 900, 904 and 910 overlap in the three consecutive frames 700*a*, 700*b*, 700*c*. Therefore, 900, 904, 910 is counted because it is assumed to be a true face. However, detected faces 902, 906 and 908 are not likely to be a true face; that is, they are false positives because they appear in different regions in each consecutive frame 700*a–c*. Thus, the number of actual faces detected in the frame is one instead of two. Tracking detected faces through consecutive frames reduces the number of false positives and thus increases the likelihood of finding a keyframe with people.

Figure 9B:
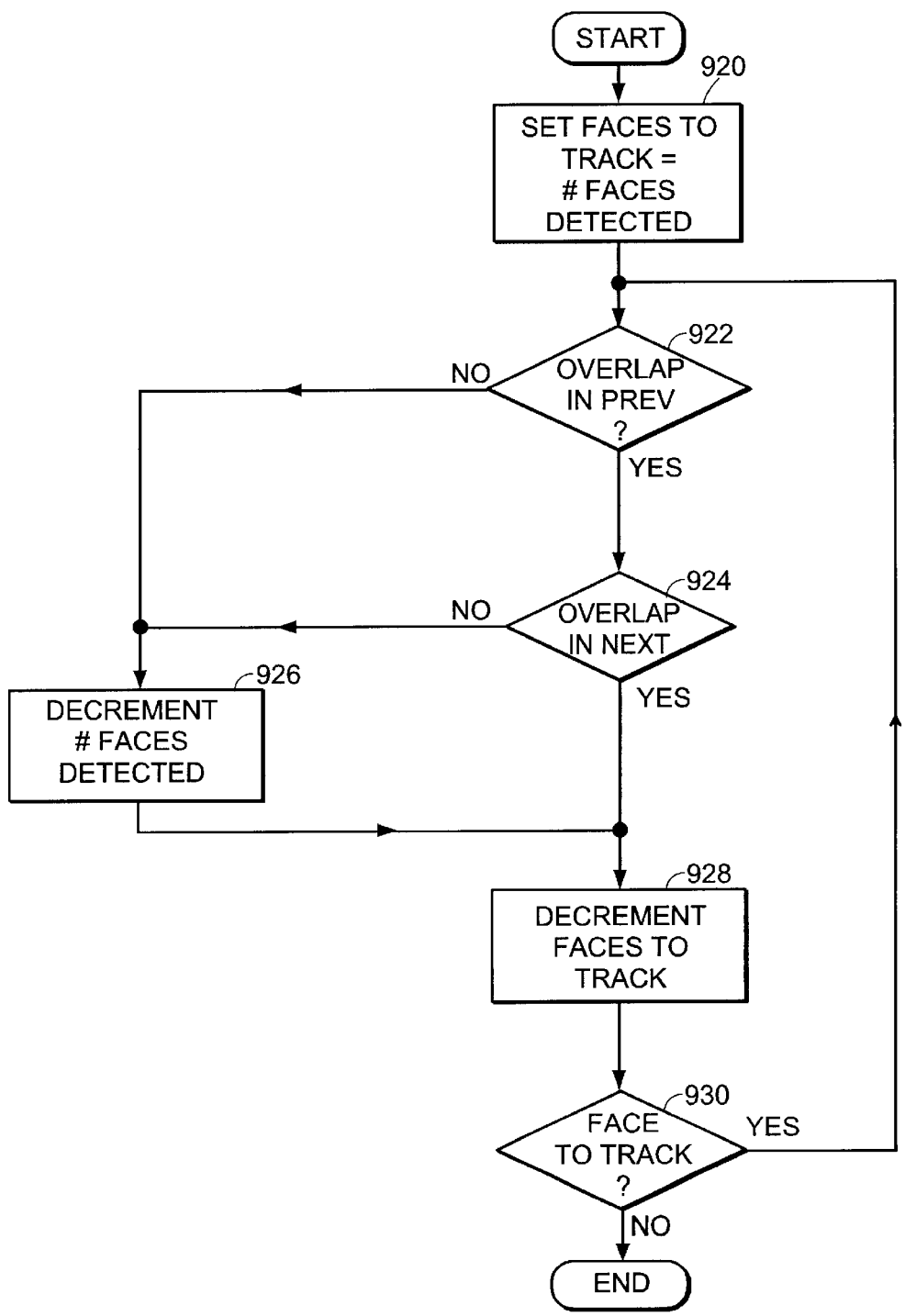
FIG. 9B is a flowchart illustrating the method for tracking a detected face.

FIG. 9B is a flowchart illustrating the method for tracking a detected face. After face detection has been performed on all the frames in the sequence of frames as has already been described in conjunction with FIG. 6, a number of detected faces and the location of each detected face is stored for each frame.

At step 920, the number of faces to track is set equal to the number of detected faces for the current frame. Processing continues with step 922.

At step 922, the location of the detected face is compared with locations of detected faces in the previous sequential frame in the sequence of frames. If the location of the face in the current frame overlaps with the location of a detected face in the previous frame, the face may be a valid face and processing continues with step 924. If not, the detected face in the current frame is not a valid face and processing continues with step 926.

At step 924, the location of the face is compared with locations of detected faces in the next sequential frame in the sequence of frames. If the location of the face in the next frame overlaps with the location of a detected face in the next frame, the face is likely a valid face because it overlaps with the location of a detected face in the previous sequential frame and the next sequential frame from the current frame. Processing continues with step 928. If not, processing continues with step 926.

At step 926, an invalid face was detected; that is, the face is- considered to be a false positive. Thus, the number of detected frames for the current frame is decremented. Processing continues with step 928.

At step 928, the number of faces to track is decremented. Processing continues with step 930.

At step 930, the number of faces to track is examined in order to determine if there are more detected faces to track in the current frame. If so, processing continues with step 922 to determine if the next detected face is valid. If not, processing is complete.

Returning to FIG. 5, at step 502 a pixel-wise frame difference number is calculated for each frame. A measure of the amount of difference between pixels in successive frames may be used to determine a shot boundary in the digital video file. The pixel-wise frame difference number is computed by calculating the difference in intensity between a pixel in the current frame and the intensity of the same pixel in the previous frame and adding the absolute value of the differences of all pixels. For successive frames in a shot, the pixel-wise frame difference is a low value because the number of pixels that change from frame to frame is low. A high value of pixel-wise frame difference indicates a possible shot boundary. The following equation is used to compute the pixel-wise frame difference number.

$$SAD(k) = \sum_{i,j} |I(i, j, k) - I(i, j, k-1)|$$

where:
- $I(i, j, k)$ denotes the image intensity at pixel location $(i, j)$ in frame k of the sequential frames.
- $I(i, j, k-1)$ denotes the image intensity at pixel location $(i, j)$ in frame k-I of the sequential frames.
- $SAD(k)$ denotes the Sum of Absolute Difference of the intensity of all pixels in frame k and frame k−1.

The pixel-wise frame difference value is susceptible to false detection of shot boundaries because it is sensitive to rapid changes in movement.

At step 506 another measure of motion activity is computed to reduce false detections of shot boundaries based on pixel-wise intensity difference. This measure of activity is based on a luminance histogram for the frame, that is, a plot of the luminance distribution in the frame, in which each pixel has a luminance value between 0 and 255. The cumulative distribution of the luminance histogram for the current frame and the previous frame are compared. The Kolmogorov-Smirnov statistical test, a well known test in statistics, is used to compute the probability that the distribution of luminance histograms of frame k and frame k−1 are the same.

$$D(k) = \max_x |(CD(x, k) - CD(x, k-1))|$$

$$Q_{KS}(\lambda) = 2\sum_{j=1}^{\infty} (-1)^{(j-1)} e^{-2j^2\lambda^2}$$

$$P_{KS}(k) = Q_{KS}\left(\sqrt{N/2} * D(k)\right)$$

where:
k is a frame
x is the gray level value (x ∈[0, 255])
CD(x,k) is the cumulative distribution of the luminance histogram for frame k
$P_{ks}(k)$ is the probability that the distribution of luminance histograms of frame k and frame k−1 are the same.

Figure 10A:
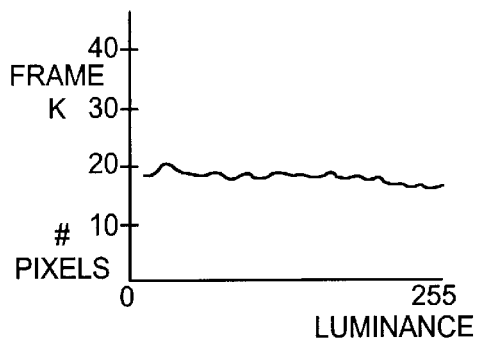
FIGS. 10A–10E illustrate luminance histograms and $P_{ks}$ measurements which are described in conjunction with FIG. 5.
Figure 10B:
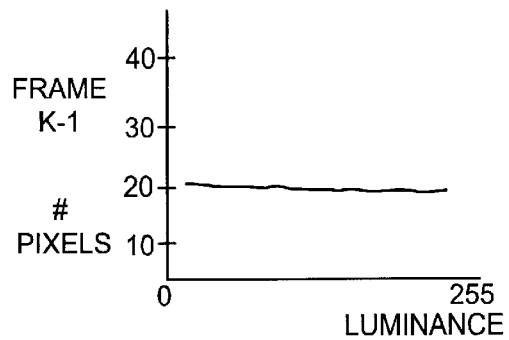
Figure 10C:
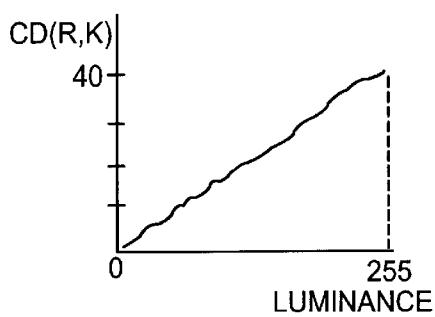
Figure 10D:
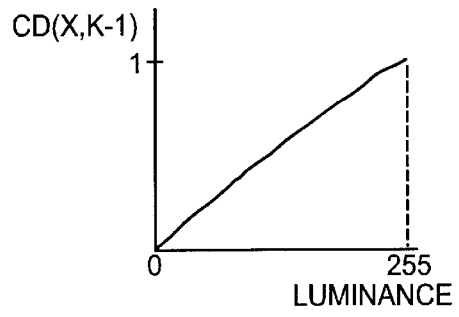
Figure 10E:
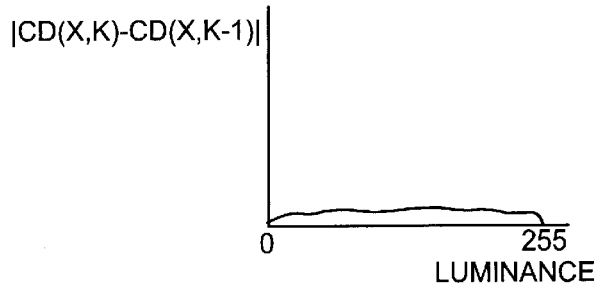

In FIG. 10A a luminance histogram is shown for frame k. The number of pixels is on the y-axis. The pixel luminance values are on the x-axis. In FIG. 10B a luminance histogram is shown for frame k−1. As can be seen, the histograms for frame k−1 and frame k differ slightly for a number of pixel intensities. In FIG. 10C the cumulative distribution of luminance for frame k is shown. FIG. 10D shows the cumulative distribution of luminance for frame k−1. As can be seen in FIG. 10E the difference between the cumulative distribution of luminance for frame k and the cumulative distribution of luminance for frame K−1 is small. $P_{ks}$ is a single number computed for the frame with a value between 1 and 0 dependent on the Kolmogorov-Smirnov statistical test.

At step 504 in FIG. 5 a measure of spatial activity is computed for the frame. The measure of spatial activity is measured by the entropy of a frame using the equation below:

$$H(k) = -\sum_x p(x,k) \log_2(p(x,k))$$

where:
p(x, k) is the probability of the gray-level value x in the luminance histogram of frame k.

A high value of entropy indicates a frame with a high spatial content. A frame with a high spatial content has a flat histogram because the pixel luminance is spread out amongst all the possible pixel luminance values. A frame with a low spatial content has a histogram in which the luminance of all pixels centers around the same luminance creating a histogram with a peak. For example, a frame including a boat in a lake on a cloudless day would have a histogram with a large portion of pixels centering around the color blue.

Returning to FIG. 5, at step 508, a measure of the percentage of skin pixels is computed from a color histogram of the frame pixels. The color of each pixel in the frame is compared to a known distribution of skin-like or human flesh color. This measure is useful to indicate a frame likely to include skin, for example, to select a frame in a digital video file showing humans.

At steps 510 and 512, a measure of forward and backward discontinuity is computed based on the pixel-wise frame difference between successive frames. The forward discontinuity measure is the difference between the current frame's pixel-wise frame difference and the next frame's pixel-wise frame differences. The current frame's pixel-wise difference may also be compared with more than one next frame's pixel-wise frame difference and the maximum difference selected as the forward discontinuity. The equation is shown below:

$$D_{for}(k) = \max_i (SAD(k) - SAD(i)) \ i = k+l, \ldots, k+m$$

where:
k is the current frame
$D_{for}$ is the forward discontinuity typically m=1 or 2.

A measure of backward discontinuity is the difference between the current frame's pixel-wise frame difference and the previous frame's pixel-wise frame difference. The current frame's pixel-wise difference may also be compared with greater than one previous frame's pixel-wise frame difference and the maximum difference selected as the backward discontinuity. The equation is shown below:

$$D_{back}(k) = \max_i (SAD(k) - SAD(i)) \ i = k-m, \ldots, k-l$$

where:
$D_{back}$ is the backward discontinuity
k=current frame, typically m=1 or 2.

Figure 11:
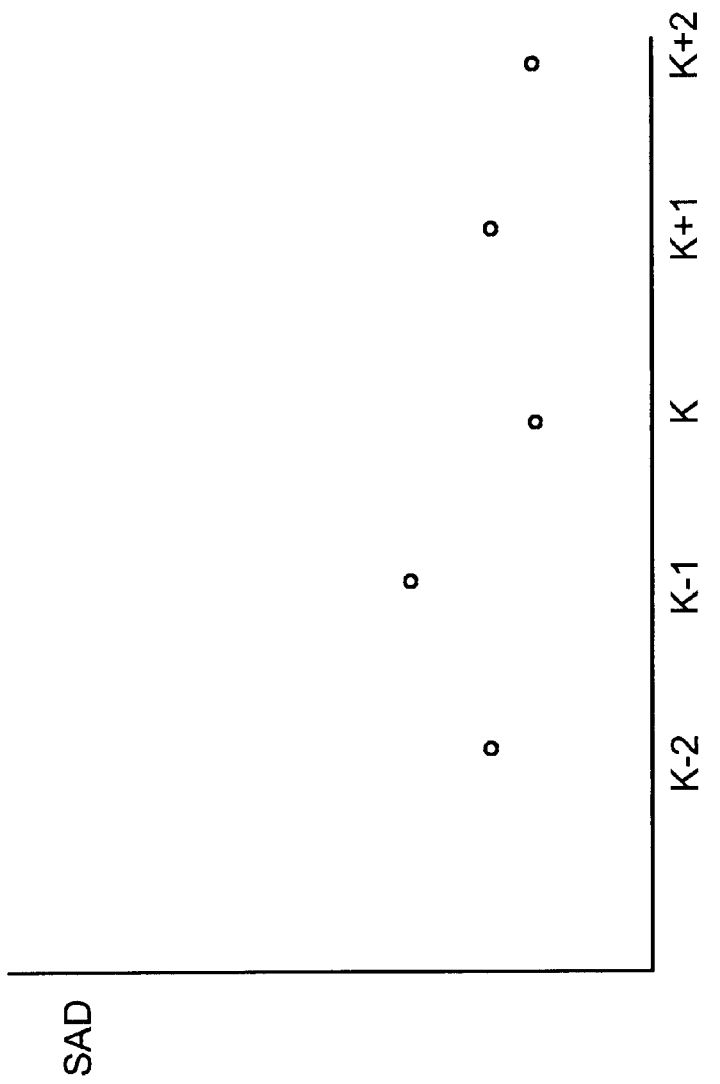
FIG. 11 is a graph of pixel-wise difference values for successive frames.

FIG. 11 illustrates a graph of pixel-wise difference values for successive frames k. Returning to FIG. 5, at step 514, if there is another frame to be processed, processing continues with step 500. If not, having computed all necessary measures for the individual frames required for detection of shot boundaries and key shots, the system proceeds as follows.

Figure 12:
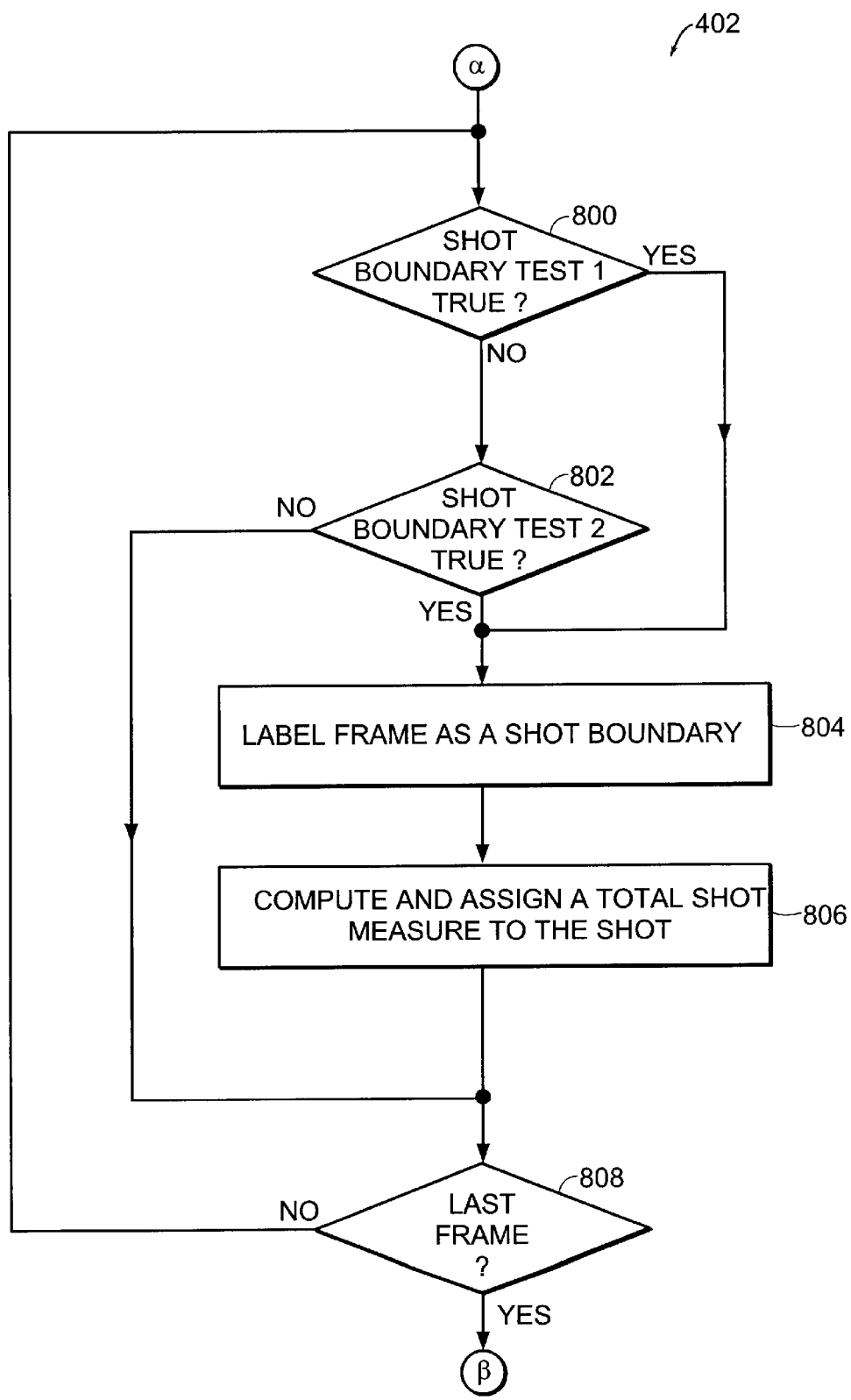
FIG. 12 is a flowchart illustrating the steps for detecting shot boundaries.

Step 402 in FIG. 4 is described in greater detail later in conjunction with FIG. 12. FIG. 12 is a flowing illustrating the steps for detecting shot boundaries in the digital video file. Two tests are used to determine if the current frame is a shot boundary.

At step 800 test1 is applied using the frame measurements computed in the steps illustrated in FIG. 5. Test1 performs the following test:

$$\max (D_{back}(k), D_{for}(k))/P_{KS}(k) > 2*\sigma$$

where:
σ is the standard deviation of the pixel-wise frame difference.

Although the test relies on a ratio of $D_{for}$, $D_{back}$, and $P_{KS}$ the test may be performed on either one.

Figure 13A:
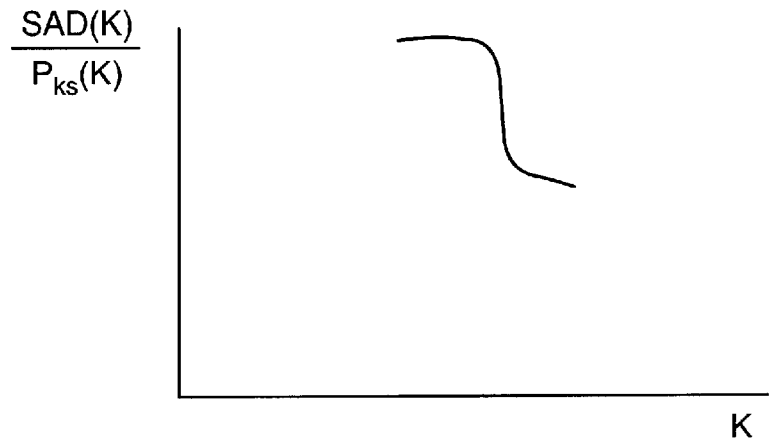
FIGS. 13A–C illustrate the type of shot boundaries detected.
Figure 13B:
Figure 13C:
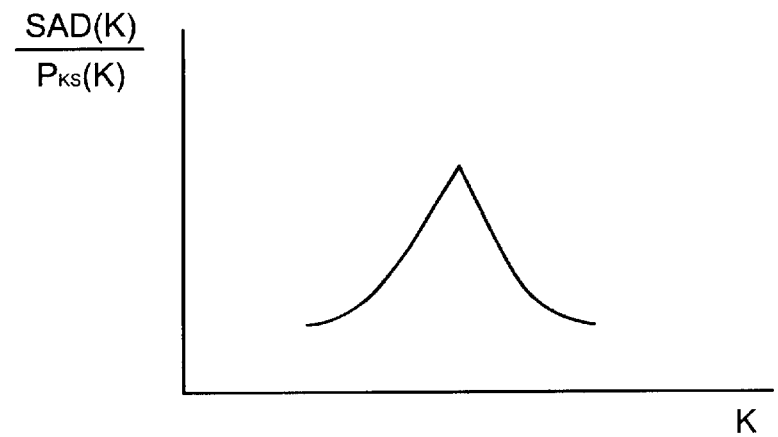

FIGS. 13A–13C illustrate the type of shot boundaries detected by the two tests. The frames k are on the x-axis. A value dependent on the pixel-wise frame difference on the $P_{ks}$ is on the y-axis. As shown in FIG. 13A, test1 detects a shot boundary between frames with a small $D_{back}$ followed by frames with a large $D_{for}$. This type of shot boundary occurs when a shot with high motion activity is followed by a shot with low motion activity. As shown in FIG. 13B, test1 also detects a shot boundary between frames with a large $D_{back}$ followed by frames with a small $D_{for}$. This type of shot boundary occurs when a shot with a low motion activity is followed by a shot with high motion activity. If a shot boundary is not detected using test1 a second test, test2 is performed at step 602. Test2 is applied using the frame measurements computed in the steps illustrated in FIG. 5. Test2 performs the following test:

max $(D_{back}(k), D_{for}(k))/P_{KS}(k) > \sigma$ and min $(D_{back}(k), D_{for}(k))/P_{KS}(k) > \sigma/2$ where:

$\sigma$ is the standard deviation of the pixel-wise frame difference.

Test2 detects a shot boundary looking at both the maximum and the minimum thresholds for $D_{back}$ and $D_{for}$. The max threshold is less than in test 1 because of a higher confidence in detecting a peak (minimum and maximum value) instead of a step (minimum or maximum value). FIG. 13C illustrates a low motion activity shot followed by another low motion activity shot. Test2 detects this shot boundary.

If test1 or test2 is true the frame is labeled as a shot boundary at step 804. Having reached the end of a shot the total measure of the shot is computed at step 806. The total measure of the shot preceding the shot boundary is computed to determine a measure of how interesting the shot is. Interesting shots may be determined by the amount of skin colored pixels, the entropy, the amount of motion activity, number of detected faces and the length of the shot. The amount of skin colored pixels is used to determine the most interesting shot because typically the most interesting shot in the digital video is the shot with humans in it. The entropy is used to determine the most interesting shot because a shot with a low distribution of pixel intensity typically does not have a lot of objects in it. The amount of motion activity is used to determine the most interesting shot because shots with a lot of motion activity indicate that they are important to the digital video. The length of the shot is used to determine the most interesting shot in a digital video because typically the camera will stop at a position longer at an interesting shot.

The factors to compute an interesting shot may be given weights to reduce the emphasis on one or more of the measures dependent on the type of digital video file. For example, a digital video with a lot of motion activity in all shots may reduce the emphasis on motion so as to select the most interesting shot from other parameters. The equation for computing the total shot measure is shown below:

$$Score(shot) = w_{SAD}\frac{MEDSAD}{\sigma_{SAD}} + w_H \frac{MEDH}{\sigma_H} + w_S \frac{MEDS}{\sigma_S} + w_F \frac{SUMF}{\sigma_F} + w_T \frac{T}{\sigma_T}$$

where:

MEDH is the median of entropy of all frames in the shot.

MEDS is the median of skin pixels percentage of all frames in the shot.

MEDSAD is the median of pixel-wise frame difference in all frames in the shot.

SUMF is the sum of all faces detected in the shot.

Score(shot) is the total measure of the shot

T is the length of the shot expressed in seconds. $\sigma_H$, $\sigma_S$, $\sigma_{SAD}$, $\sigma_T$ and $\sigma_F$ are the standard deviations of $med_H$, $med_{Skin}$, $med_{SAD}$, T and F respectively computed on a training set. $W_H$, $W_S$, $W_{SAD}$, $W_T$ and $W_F$: are weighting factors for H, S, SAD, T and F.

The weighting factors $W_H$, $W_S$, $W_{SAD}$, $W_T$ and $W_F$ are scaling factors for the respective measure and are selected dependent on the reliability of the measure. A measure with a high degree of confidence has a higher weighting factor than a measure with a low degree of confidence. The default values for the weighting factors are as follows: $W_H=2$, $W_S=0.5$, $W_{SAD}=1$, $W_T=1$ and $W_F=1$. The weighting factor for entropy is highest because entropy is a reliable measure. However, if MEDH falls below a threshold value, the total score for the shot is set to zero. The threshold value is typically 4. The weighting factor for percentage of skin color pixels is lowest because percentage of skin color pixels is not a reliable measure. The weighting factor for face detection is higher than that for percentage of skin color pixels because face detection is a more reliable measure of people in a shot or frame than the percentage of skin color pixels.

The weighting factor for length of shot is modified for beginning and ending shots. Beginning and ending shots tend to be long shots but they are not interesting shots because they typically include text, such as an FBI warning at the beginning of the video and the credits at the end of the video. Thus, for the beginning and ending shots the weighing factor for length of shot is decreased to zero or 0.2.

The weighting factor for length of shot and percentage of skin color pixels are reduced if MEDSAD is greater than a threshold. The weighting factor for length of shot is decreased to 0.5 and the weighing factor for percentage of skin pixels is decreased to 0.25 because it is not likely that a scene with a lot of motion will include people. Scenes including people usually have low motion because the camera moves slowly.

Figure 14:
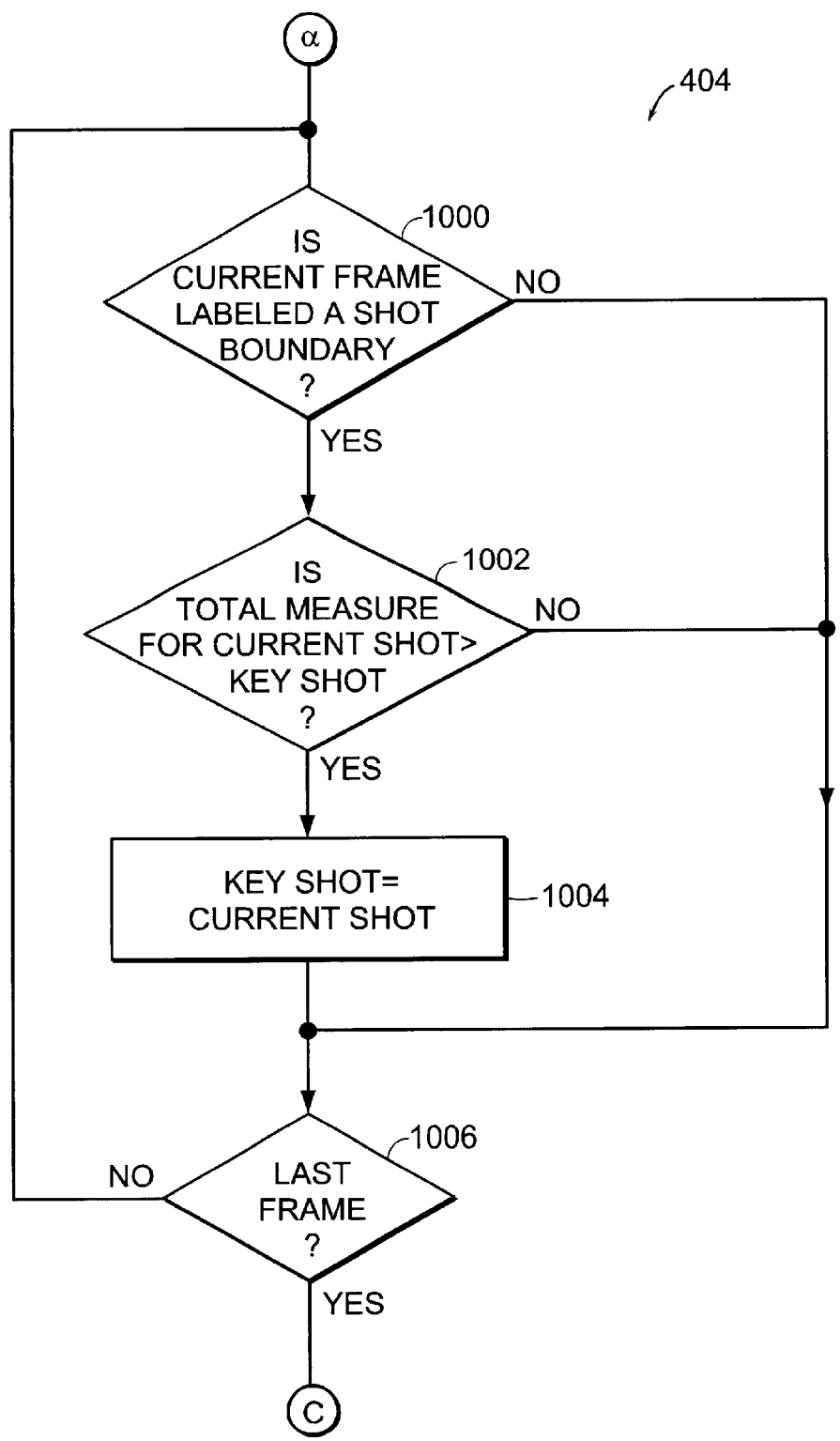
FIG. 14 is a flowchart illustrating the steps for selecting a key shot.

Step 404 in FIG. 4 is described in greater detail later in conjunction with FIG. 14. FIG. 14 is a flowchart illustrating the steps for selecting a keyshot. Knowing the shot boundaries and the total measure for each shot, the most interesting shot is selected as the shot having the largest total measure.

At step 1000, the keyshot detector determines if the current frame in the video file is labeled a shot boundary. If so, processing continues with step 1102. If not, processing continues with step 1002.

At step 1002, the keyshot detector compares the total measure stored for the current shot with the total measure stored for the key shot. If the total measure of the current shot is greater than the total measure of the key shot, processing continues with step 1004. If not, processing continues with step 1006.

At step 1004, the current shot is selected as the key shot. Processing continues with step 1006.

At step 1006, the keyshot detector determines if the current frame is the last frame in the video file. If so, processing of the shots in the video file is complete. If not, processing continues with step 1000.

All frames in the video file are checked for shot boundaries until the last frame is reached. The total measure of all shots in the video file are compared and the shot with the highest total measure is selected as the most interesting shot in the video file.

Figure 15:
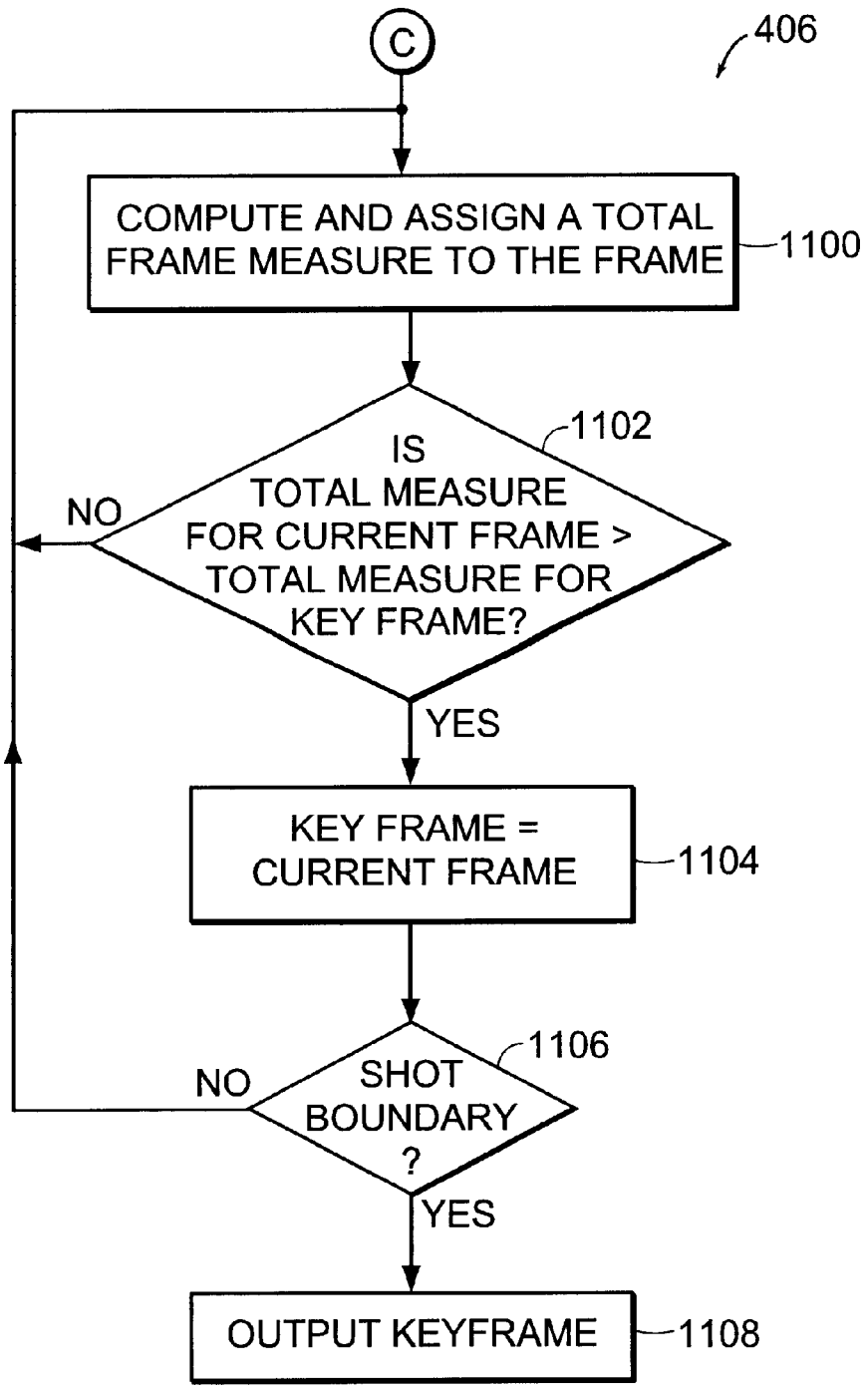
FIG. 15 is a flowchart illustrating the steps for selecting a key frame in the key shot.

Step 406 in FIG. 4 is described in greater detail later in conjunction with FIG. 15. FIG. 15 illustrates the steps for selecting the most representative frame from the most interesting shot.

At step 1100 a total measure for the frame is computed from the entropy of the frame, the percentage of skin color pixels, the number of faces detected and the pixel-wise frame difference calculated for the frame. The total measure of the frame favors the frame in the shot with the least motion activity because selecting a frame with the most motion may result in the display of a fuzzy frame due to the motion. Motion is not captured well by compression algorithms often used on the digital video file located on the WWW. The equation for selecting the total frame measure is provided below:

$$Score(frame) = w_H \frac{H(k)}{\sigma_H} + w_S \frac{S(k)}{\sigma_S} + w_F \frac{F(k)}{\sigma_F} - w_{SAD} \frac{SAD(k)}{\sigma_{SAD}}$$

where:

Score (frame) is the total frame measure.

H(k) is the entropy of frame k.

SAD(k) denotes the Sum of Absolute Difference of the intensity of all pixels in frame k and frame k−1.

F(k) is the sum of the number of faces detected.

S(k) is the percentage of skin-color pixels.

$\sigma_H$ is the standard deviation of H computed on a training set.

$\sigma_{SAD}$ is the standard deviation of SAD computed on a training set.

$\sigma_S$ a is the standard deviation of S computed on a training set.

$\sigma_F$ is the standard deviation of F computed on a training set.

$W_H, W_{SAD}, W_S$ and $W_F$ are weighing factors for H, SAD, S and F.

The weighing factors are selected as discussed in conjunction with FIG. 14. The most interesting frame within the most interesting shot is the frame with the greatest amount of entropy relative to the amount of motion, that is, the space having the greatest frame measure value Score(frame)computed above. Processing continues with step 1102.

At step 1102, the total frame measure of the current frame in the most interesting shot is compared with the keyframe measure stored for a previous frame or zero if the frame is the first frame to be examined in the most interesting shot. If the total frame measure is greater than the stored keyframe measure, processing continues with step 1104. If not, processing continues with step 1100.

At step 1104, the current frame is selected as the key frame. Processing continues with step 1106.

At step 1106, the keyframe detector determines if the current frame is a shot boundary. If so, processing continues with step 1108. If not, processing continues with step 1100.

At step 1108, the key frame for the most interesting shot in the video file is selected for the video. The keyframe can be stored with the video. Processing is complete.

Returning to FIG. 2 after the key frame has been output from the keyframer daemon 110. At step 206 the mover daemon 116 moves the key frame to the index of multimedia files 118 at step 210. At step 212 the reaper daemon 120 deletes the common format video file.

In another embodiment of the present invention more than one keyframe may be output by selecting a keyframe from each of a number of the most interesting shots.

It will be apparent to those of ordinary skill in the art that methods involved in the present system may be embodied in a computer software program product that includes a computer usable medium. For example, such a computer usable medium can include a readable memory device, such as a solid state memory, hard drive device, a CD-ROM, a DVD-ROM or a computer diskette, having computer readable software program code segments stored thereon. The computer readable medium can also include a communications or transmission medium, such as a bus or communications link, either wired, optical or wireless having software program code segments carried thereon as digital or analog data signals.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of extracting a single representative key frame from a sequence of frames, the sequence of frames including a plurality of shots, comprising the steps of:

performing face detection in the sequence of frames comprising the steps of:

creating a set of images for each frame in the sequence of frames with each image in the set of images smaller than the previous image; and searching for faces having at least a minimum size in a selected portion of the set of images;

detecting shot boundaries in the sequence of frames to identify shots within the detected shot boundaries;

selecting a most interesting shot from the identified shots based on a number of detected faces in the shot; and selecting the single representative key frame representative of the sequence of frames from the selected shot based on a number of detected faces in the frame.

2. The method of claim 1 wherein the selected portion of the set of images is based on the minimum size face to be detected.

3. The method as claimed in claim 1 wherein the images are smaller by the same scale factor.

4. The method as claimed in claim 3 further comprising the step of:

selecting the scale factor dependent on the size of the frame.

5. The method as claimed in claim 1 further comprising the step of:

tracking overlap of a detected face in consecutive frames in order to filter detected faces which are not likely to be valid.

6. The method as claimed in claim 1 wherein the step of selecting a most interesting shot includes providing a shot score based on a set of measures selected from the group consisting of motion between frames, amount of skin color pixels, shot length and detected faces.

7. The method as claimed in claim 6 wherein each measure includes a respective weighting factor.

8. The method as claimed in claim 7 wherein the weighting factor is dependent on the level of confidence of the measure.

9. The method as claimed in claim 1 wherein the step of performing face detection uses a neural network-based algorithm.

10. An apparatus for extracting a single representative key frame from a sequence of frames comprising:

means for performing face detection in the sequence of frames, the means for performing comprising:

means for creating a set of images for the frame with each image in the set of images smaller than the previous image; and means for searching for faces having at least a minimum size in a selected portion of the set of images;

means for detecting shot boundaries in the sequence of frames to identify shots within shot boundaries;

means for selecting a most interesting shot from the identified shots based on a number of detected faces in the shot; and means for selecting the single representative key frame representative of the sequence of frames from the selected shot based on a number of detected faces in the frame.

11. The apparatus as claimed in claim 10 wherein the selected portion of the set of images is based on the minimum size face to be detected.

12. The apparatus as claimed in claim 10 wherein the images are smaller by the same scale factor.

13. The apparatus as claimed in claim 12 further comprising:
means for selecting the scale factor dependent on the size of the frame.

14. The apparatus as claimed in claim 10 further comprising:
means for tracking overlap of a detected face in consecutive frames to filter detected faces which are not likely to be valid.

15. The apparatus as claimed in claim 10 wherein the means for selecting a most interesting shot comprises:
means for providing a shot score based on a set of measures selected from the group consisting of motion between frames, amount of skin color pixels, shot length and detected faces.

16. The apparatus as claimed in claim 15 wherein each measure includes a respective weighting factor.

17. The apparatus as claimed in claim 16 wherein the weighting factor is dependent on the level of confidence of the measure.

18. The apparatus as claimed in claim 10 wherein the means for performing face detection uses a neural network-based algorithm.

19. An apparatus for extracting a single representative key frame from a sequence of frames comprising:
a face detector which performs face detection in the sequence of frames the face detector including:
an image creator which creates a set of images for the frame with each image in the set of images smaller than the previous image; and
a face searcher which searches for faces having at least a minimum size in a selected portion of the set of images; and
a key frame selector which selects a key frame representative of the sequence of frames from the sequence of frames based on a number of detected faces in the frame.

20. The apparatus as claimed in claim 19 wherein the selected portion of the set of images is based on the size of the face to be detected.

21. The apparatus as claimed in claim 19 wherein the images are smaller by the same scale factor.

22. The apparatus as claimed in claim 21 further comprising:
a frame sampler which selects the scale factor dependent on the size of the frame.

23. The apparatus as claimed in claim 19 further comprising:
a face tracker which tracks a detected face through consecutive frames to filter detected faces which are not likely to be valid.

24. The apparatus as claimed in claim 19 wherein the key shot detector comprises:
a shot score generator which generates a shot score for based on a set of measures selected from the group consisting of motion between frames, amount of skin color pixels, shot length and detected faces.

25. The apparatus as claimed in claim 24 wherein each measure includes a respective weighting factor.

26. The apparatus as claimed in claim 25 wherein the weighting factor is dependent on the level of confidence of the measure.

27. The apparatus as claimed in claim 19 wherein the face detector uses a neural network-based algorithm.

28. A computer system comprising:
a memory system storing a sequence of frames; and
a face detector which performs face detection in the sequence of frames, the face detector comprising:
an image creator which creates a set of images for the frame with each image in the set of images smaller than the previous image; and
a face searcher which searches for faces having at least a minimum size in a selected portion of the set of images;
a shot boundary detector which detects shot boundaries to identify shots within the detected shot boundaries; and
a key shot selector which selects a most interesting shot from the identified shots based on a number of detected faces in the shot; and
a key frame selector which selects the single representative key frame representative of the sequence of frames from the selected shot based on a number of detected faces in the frame.

29. An article of manufacture comprising:
a computer-readable medium for use in a computer having a memory;
a computer-implementable software program recorded on the medium for extracting a single representative key frame from a sequence of frames, the sequence of frames including a plurality of shots, the computer implemented software program comprising instructions for:
performing face detection in the sequence of frames comprising the steps of:
creating a set of images for each frame in the sequence of frames with each image in the set of images smaller than the previous image; and
searching for faces having at least a minimum size in a selected portion of the set of images;
detecting shot boundaries in the sequence of frames to identify shots within the detected shot boundaries;
selecting a most interesting shot from the identified shots based on a number of detected faces in the shot; and
selecting the single representative key frame representative of the sequence of frames from the selected shot based on a number of detected faces in the frame.

* * * * *